3,349,114
DIETHYLAMINOETHOXYETHYL ESTER OF α-PHENYLBUTYRIC ACID AND SALTS THEREOF

Jean Heusser, Adliswil-Zurich, Switzerland, assignor to Hommel A.G., Adliswil-Zurich, Switzerland, a corporation of Switzerland
No Drawing. Filed May 17, 1963, Ser. No. 281,339
2 Claims. (Cl. 260—477)

The subject matter of the present invention is a method of preparing α-phenylbutyric acid diethylaminoethoxyethyl ester and its salts.

It is known that the basic esters of α-phenylbutyric acid, for instance the phenylethyl acetic acid-diethylaminoethyl esters have good spasmolytic, local anesthetic and cough-allaying properties.

Depending on the basic alcohol which is used for the esterification, the properties of the α-phenylbutyric acid esters can be varied.

It has now been found that the diethylaminoethoxyethyl ester of α-phenylbutyric acid advantageously differs in various points and particularly with respect to its low toxicity, from known basic esters. Its physical-chemical properties, for instance, its very high stability in particular to alkalies are also remarkable.

The basic ester forms, with inorganic and organic acids, salts which are produced in known manner by bringing aliquot portions of the basic ester and of the acid together in suitable solvents.

The basic ester can be distilled in high vacuum at 140–155° C./1 mm. Hg and at ordinary temperatures is a practically colorless liquid having a peculiar odor. The ester is insoluble in water but very readily soluble in various organic solvents such as alcohol, acetone and ether. The salts, in so far as they are solid, can be crystallized well and have a characteristic melting point; the citrate, for instance, is white, hygroscopic and melts at 75° $C_k$.

The production of the basic ester is effected by esterification of a α-phenylbutyric acid halide, α-phenylbutyric acid ester or else of α-phenylbutyric acid itself with diethylamino-ethoxyethanol, the conditions being varied in known manner depending on the starting material.

Thus, for instance, depending on the conditions both acids and bases can be used as condensation agents.

EXAMPLE 1

18.2 grams of α-phenylbutyric acid chloride are dissolved in 25 ml. of toluene. To this solution, there is slowly added a solution of 16.1 grams of diethylaminoethoxyethanol in 25 ml. of toluene, the reaction mixture thereby becoming hot.

It is then heated for 8 hours under reflux. The reaction mixture, after cooling, is carefully poured onto 75 grams of ice and made alkaline with dilute ammonia. After thorough shaking of the solution, the toluene layer is removed and washed until neutral with water. The toluene solution is treated with carbon and dried over sodium sulfate. The toluene is distilled off from the filtered solution.

The residue is α-phenylbutyric acid diethylaminoethoxyethyl ester. The basic ester is purified by distillation in a high vacuum. 10 grams of the ester are added to a solution of 7 grams of citric acid in 30 ml. of warm acetone. After standing for some time, the citrate of the ester crystallizes out. After suction filtration and washing with acetone the ester citrate is recrystallized from acetone. The melting point of the citrate is 75° $C_k$.

In place of the citric acid, adipic, succinic, malonic, phosphoric, tartaric, sulfuric and hydrochloric acids may be used to like effect. However, citric is preferred because its salts are solid.

EXAMPLE 2

18.2 grams of α-phenylbutyric acid chloride are dissolved in 25 ml. of toluene and slowly added to a solution of 16.1 grams of diethylaminoethoxyethanol in 25 ml. of toluene.

The reaction mixture is set aside for five days at room temperature. The reaction mixture is then poured onto 75 grams of ice and worked up in the manner described in Example 1.

EXAMPLE 3

100 grams of α-phenylbutyric acid are dissolved in 100 ml. of toluene and 120 grams of diethylaminoethoxyethanol.

Dry gaseous hydrogen chloride is now introduced, with agitation and cooling, until saturation is obtained. The temperature should be maintained between 10° and 20° C. The reaction mixture is set aside for five days and then poured onto 400 grams of ice, whereupon the ester and its salts are recovered in the manner described in Example 1.

EXAMPLE 4

19.2 grams of α-phenylbutyric acid ethyl ester and 20 grams of diethylaminoethoxyethanol are treated with sodium methylate which contained 0.3 gram of sodium, and boiled for six hours under reflux. The reaction mixture is poured onto ice and the ester is extracted with toluene. The toluene solution is washed neutral with water, dried and treated with carbon. In vacuum, the toluene and the α-phenylbutyric acid ethyl ester which has not undergone ester interchange are removed.

The remaining basic ester is converted into the citrate in the manner described in Example 1. α-Phenylbutyric acid and α-phenylbutyric halide may be substituted for α-phenylbutyric acid ethyl ester with like results.

It was found that 1 mg./kg. of the basic ester prepared in accordance with the invention eliminates an experimentally produced cough reflex in cats for 20 minutes. The diethylaminoethoxyethanol ester of α-diethylphenyl acetic acid (J. Pharm. and Pharmacol. 9, 451, 1957) on the other hand eliminates a cough reflex for 25 minutes in an amount of 2 mg./kg. If it is borne in mind that the results of the cough-alleviating effect show variations caused by the method, these two preparations can be considered practically identical in their effect. On page 452 (J. Pharm. and Pharmacol. 9, 452, 1957) it can further be noted that the diethylaminoethoxyethanol ester of 1-phenyl-1-cyclopentacarboxylic acid also has an effect which is of about the same order of magnitude. A graph in Arch. int. Pharmacodyn. 202, 1955, shows the same results.

Since the basic ester prepared in accordance with the invention, the diethylaminoethoxyethanol ester of α-diethylphenyl acetic acid and the diethylaminoethoxyethenol ester of 1-phenyl-1-cyclopentancarboxylic acid must be considered identical in their effect, it was not foreseeable that they would differ entirely with respect to their toxicity. The results of the toxicity tests are set forth below.

Tests on mice, administration by mouth

| | $DL_{50}$ |
|---|---|
| α-Diethylphenyl acetic acid ester | 130 |
| 1-phenyl-1-cyclopentancarboxylic acid ester | [1] 130 / [2] 230 |
| Codeinphosphate | [1] 300 |
| Ester in accordance with the method of the invention | 1200 |

[1] From J. Pharm. and Pharmacol. 9, 453 (1957).
[2] From Arch. int. Pharmacodyn. 209 (1955).
$DL_{50}$ represents the dose (in mg./kg.) at which 50% of the mice tested died.

On basis of these examinations, the basic esters prepared in accordance with the invention are five to ten times less toxic than the diethylaminoethoxyethanol esters of α-diethylphenyl acetic acid and 1-phenyl-1-cyclopentan-carboxylic acid. This results in an unexpected broadening of the therapeutic spectrum which can be considered an essential advance in connection with these highly effective substances.

If there is taken as average pharmacological effective dose for the above-mentioned three esters, a dose of 2 mg./kg. this gives the following therapeutic index.

| | Therapeutic index |
|---|---|
| Ester prepared in accordance with the invention | 600 |
| α-Diethylphenyl acetic acid diethylaminoethoxyethanol ester | 65 |
| 1 - phenyl - cyclopentancarboxylic acid diethylaminoethoxyethanol ester | 65–115 |

$$\text{Therapeutic index} = \frac{DL_{50}}{\text{Effective dose}}$$

In view of the scope of this invention, it is to be broadly construed and not to be limited except by the claims appended hereto.

I claim:
1. As new compounds, the diethylaminoethoxyethyl ester of α-phenylbutyric acid and salts thereof with physiologically acceptable acids.
2. Compounds according to claim 1 wherein said acids are taken from the class consisting of citric, adipic, succinic, malonic, phosphoric, tartaric, sulfuric and hydrochloric.

References Cited

UNITED STATES PATENTS

| 2,219,796 | 10/1940 | Viaud | 260—477 |
| 2,669,577 | 9/1950 | Cusic | 260—477 |
| 2,885,404 | 5/1959 | Petrow et al. | 260—477 |

LORRAINE A. WEINBERGER, *Primary Examiner.*

R. K. JACKSON, *Examiner.*

T. L. GALLOWAY, *Assistant Examiner.*